US009731646B2

(12) United States Patent
Shin et al.

(10) Patent No.: US 9,731,646 B2
(45) Date of Patent: Aug. 15, 2017

(54) LIGHT SOURCE MODULE OF LAMP FOR VEHICLE

(71) Applicant: Hyundai Motor Company, Seoul (KR)

(72) Inventors: Jik Soo Shin, Incheon (KR); Keon Soo Jin, Ulsan (KR); Jin Ho Na, Gyeonggi-Do (KR); Ki Hong Lee, Seoul (KR); Byoung Suk Ahn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 50 days.

(21) Appl. No.: 14/995,819

(22) Filed: Jan. 14, 2016

(65) Prior Publication Data

US 2017/0113603 A1   Apr. 27, 2017

(30) Foreign Application Priority Data

Oct. 23, 2015   (KR) .......................... 10-2015-0147822

(51) Int. Cl.
| | |
|---|---|
| *F21V 9/00* | (2015.01) |
| *B60Q 1/30* | (2006.01) |
| *B60Q 1/34* | (2006.01) |
| *B60Q 1/44* | (2006.01) |
| *F21S 8/10* | (2006.01) |
| *F21Y 115/10* | (2016.01) |

(52) U.S. Cl.
CPC ............... *B60Q 1/30* (2013.01); *B60Q 1/34* (2013.01); *B60Q 1/44* (2013.01); *F21S 48/215* (2013.01); *F21S 48/2206* (2013.01); *F21S 48/2212* (2013.01); *F21S 48/2225* (2013.01); *F21Y 2115/10* (2016.08)

(58) Field of Classification Search
CPC .. F21S 48/215; F21S 48/2206; F21S 48/2212; F21S 48/2225; F21S 48/225; F21S 48/2268; F21S 48/2281; B60Q 1/30; B60Q 1/34; B60Q 1/44
See application file for complete search history.

(56) References Cited

U.S. PATENT DOCUMENTS

| | | | | |
|---|---|---|---|---|
| 5,128,839 A | * | 7/1992 | Kato ................... | B60Q 1/2607 362/268 |
| 2003/0147252 A1 | * | 8/2003 | Fioravanti ............... | B60Q 1/04 362/543 |
| 2005/0270791 A1 | * | 12/2005 | Lee ...................... | F21S 48/1154 362/517 |
| 2008/0013333 A1 | * | 1/2008 | Koizumi .............. | B60Q 1/2696 362/511 |
| 2008/0259629 A1 | * | 10/2008 | Takuwa ............... | B60Q 1/2607 362/548 |

(Continued)

FOREIGN PATENT DOCUMENTS

| | | |
|---|---|---|
| JP | 2012-190761 A | 10/2012 |
| JP | 2014-146521 A | 8/2014 |

(Continued)

*Primary Examiner* — Alexander Garlen
(74) *Attorney, Agent, or Firm* — Mintz Levin Cohn Ferris Glovsky and Popeo, P.C.; Peter F. Corless

(57) ABSTRACT

A light source module of a lamp for a vehicle is capable of realizing a three dimensional pattern image when light sources are turned on by using a plurality of inner lenses combined stepwise and by turning a first light source and a second light source of the light sources on or off.

11 Claims, 9 Drawing Sheets

(56) References Cited

U.S. PATENT DOCUMENTS

| | | | | |
|---|---|---|---|---|
| 2014/0063805 A1* | 3/2014 | Song | ............... | F21S 48/1109 362/249.01 |
| 2015/0085512 A1* | 3/2015 | Kim | ............... | F21S 48/215 362/517 |
| 2015/0247613 A1* | 9/2015 | Doha | ............... | F21S 48/215 362/507 |

FOREIGN PATENT DOCUMENTS

| | | |
|---|---|---|
| JP | 2014-160567 A | 9/2014 |
| KR | 2009-0062172 | 6/2009 |
| KR | 10-2011-0021474 A | 3/2011 |
| KR | 10-2011-0050819 A | 5/2011 |
| KR | 10-2012-0036199 A | 4/2012 |
| KR | 10-2015-0061998 A | 6/2015 |
| KR | 2015-0071587 | 6/2015 |
| KR | 2015 0076839 | 7/2015 |

\* cited by examiner

FIG. 9
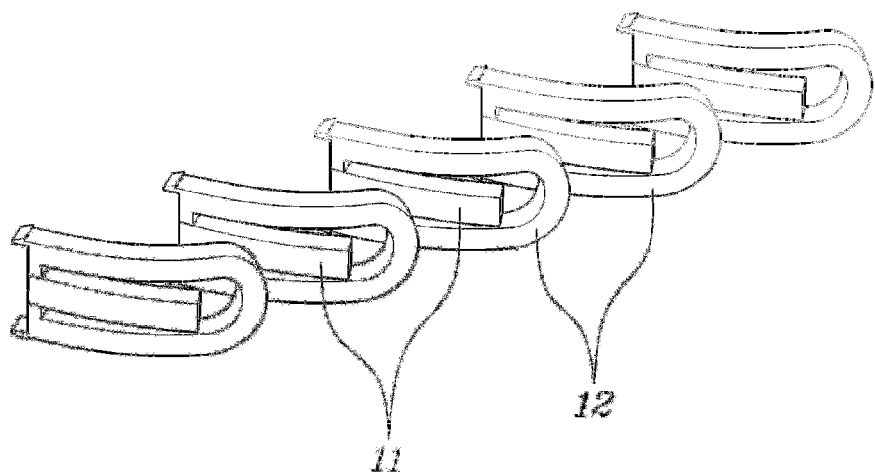
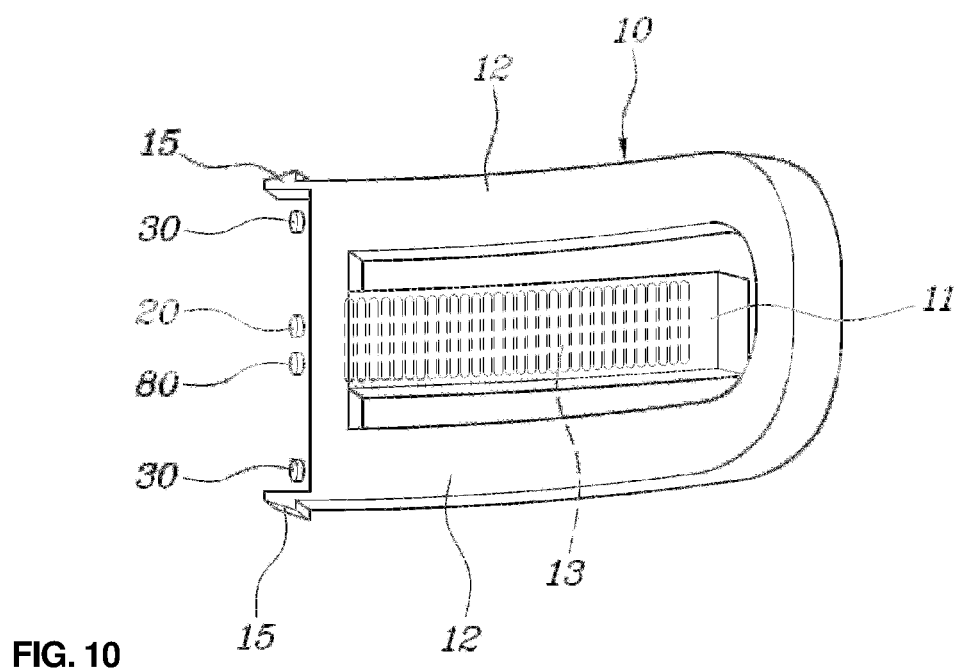
FIG. 10

LIGHT SOURCE MODULE OF LAMP FOR VEHICLE

CROSS REFERENCE TO RELATED APPLICATION

The present application claims under 35 U.S.C. §119(a) the benefit of Korean Patent Application No. 10-2015-0147822, filed Oct. 23, 2015, the entire contents of which are incorporated by reference herein.

BACKGROUND

1. Field of the Invention

The present invention generally relates to a light source module of a lamp for a vehicle, more particularly, to a light source module that is capable of realizing a three dimensional pattern image when a light source is turned on.

2. Description of the Related Art

Generally, it is desirable to arrange a rear lamp of a vehicle such that it emits light in a three dimensional pattern so as to display the light from various angles of view. Existing technologies for emitting light from the rear lamp of a vehicle include a light diffusion material, and a lighting image in the form of a face or a pipe by using a light guide, for example.

Accordingly, vehicle manufacturers have researched techniques to realize a three dimensional shape when a light source is turned on. Recently, based on this trend, there has been increased interest in organic light emitting diodes (OLEDs).

The material of an organic light emitting diode (OLED) self-emits light, and thus it is possible to make and dispose OLEDs in various shapes. However, an OLED is problematic in that the manufacturing cost thereof is high, so OLEDs generally are used in a limited manner in the automobile industry. Further, an OLED is problematic in that it is difficult to mass produce for widespread use. Particularly, an OLED may be insufficient as a light source of a lamp for a vehicle using present technology due to a failure to produce a sufficient quantity of light.

The foregoing is intended merely to aid in the understanding of the background of the present invention, and is not intended to mean that the present invention falls within the purview of the related art that is already known to those skilled in the art.

SUMMARY

The present invention is directed to a light source module of a lamp for a vehicle, the light source module being capable of realizing a three dimensional pattern image by improving a two dimensional emitted image when the light source is turned on.

The present invention also is directed to a light source module of a lamp (e.g., a rear lamp) for a vehicle, the light source module being configured such that both a stop lamp and a turn signal lamp are operated in a same area so that the size of the lamp as well as manufacturing cost thereof can be reduced.

In order to achieve the above object, according to one aspect of the present invention, there is provided a light source module of a lamp for a vehicle, including: an inner lens that has a light guide part radiating light in a predetermined direction; a light diffusion part diffusing light in all directions, with an air gap disposed between the light guide part and the light diffusion part; a first light source radiating light to the light guide part; a second light source radiating light to the light diffusion part; a printed circuit board (PCB) coupled with the first light source and the second light source, the PCB controlling the supply of an electric current to the first light source and the second light source; and a bezel coupled with both the inner lens and the PCB, the bezel implementing a bezel image as a shape or a design when the first light source and the second light source are turned off, wherein the bezel and the PCB extend stepwise in one direction, and the first and the second light sources and the inner lens are provided on each of the steps of the bezel so as to implement a three dimensional pattern image when a light source is turned on.

The light source module may further include an outer lens placed in front of the inner lens and covering the outer lens, and a lamp housing with which the bezel and the outer lens are combined.

Oriented optic protrusions may be provided on the outer, lens-facing bottom of the inside of the light guide part so that the oriented optic protrusions change the direction of the path of light so as to radiate the light generated from the first light source toward the outer lens.

Diffusion optic protrusions may be provided on the entirety of the inner surface of the light diffusion part so that the diffusion optic protrusions diffuse the light generated from the second light source in all directions.

The light guide part may serve as a stop lamp when the first light source is turned on. To achieve this, the first light source may be a red light emitting diode (LED) so as to perform a stop lamp function.

The light diffusion part may serve as a tail lamp when the second light source is turned on. To achieve this, the second light source may be a red LED so as to perform a tail lamp function.

The light source module may further include a third light source that is provided on one side of the first light source on each of the steps formed by the PCB and the bezel alike; the third light source may be coupled to the PCB and radiates light to the light guide part by the control of the PCB; the light guide part may serve as a turn signal lamp when the third light source is turned on and off, the third light source being a yellow LED so as to perform a turn signal lamp function.

A hook may be provided on one side of the inner lens, and a locking hole may be formed on the bezel so that the hook is locked to the locking hole by being inserted therein.

The first, the second, and the third light sources may be configured to be turned on or off simultaneously or individually by the control of the PCB.

The first, the second and the third light sources provided on each of the steps, formed by the PCB and the bezel alike, may be configured to be turned on or off simultaneously or sequentially along the steps by the control of the PCB.

The light source module of a lamp for a vehicle, according to the present invention, realizes a three dimensional pattern image when the light sources are turned on by using the inner lens combined stepwise and by turning the first and the second light sources on or off. Accordingly, it is capable of providing an improved luxurious effect for a vehicle, thereby improving marketability. In particular, it is advantageous in that the manufacturing cost thereof can be much less than that of a conventional OLED used to implement a three dimensional pattern image. Further, it is advantageous in that it can be brought in common use via mass production.

Further, it can provide a sufficient quantity of light by use of an LED light source, and therefore it is suitable for a light source module of a lamp for a vehicle.

Further, the present invention is configured such that a stop lamp function and a turn signal lamp function are performed selectively depending on the situation using one light guide part. Accordingly, no additional parts to perform a turn signal lamp function are required. As a result, the size of a lamp (e.g., a rear lamp) as well as the manufacturing cost and the weight thereof can be reduced significantly.

BRIEF DESCRIPTION OF THE DRAWINGS

The above and other objects, features and other advantages of the present invention will be more clearly understood from the following detailed description when taken in conjunction with the accompanying drawings, in which:

FIGS. 7 to 9 are views illustrating a three dimensional pattern image of a light guide part and a light diffusion part when a light source is turned on according to the embodiment of the present invention, in which FIGS. 7 and 8 are views illustrating the individual light-on state of the light guide part and the light diffusion part; and FIG. 9 is a view illustrating the simultaneous light-on state of the light guide part and the light diffusion part;

FIG. 10 is a view illustrating the light guide part serving as a turn signal lamp using a third light source according to the embodiment of the present invention.

DETAILED DESCRIPTION OF THE INVENTION

Figure 1:
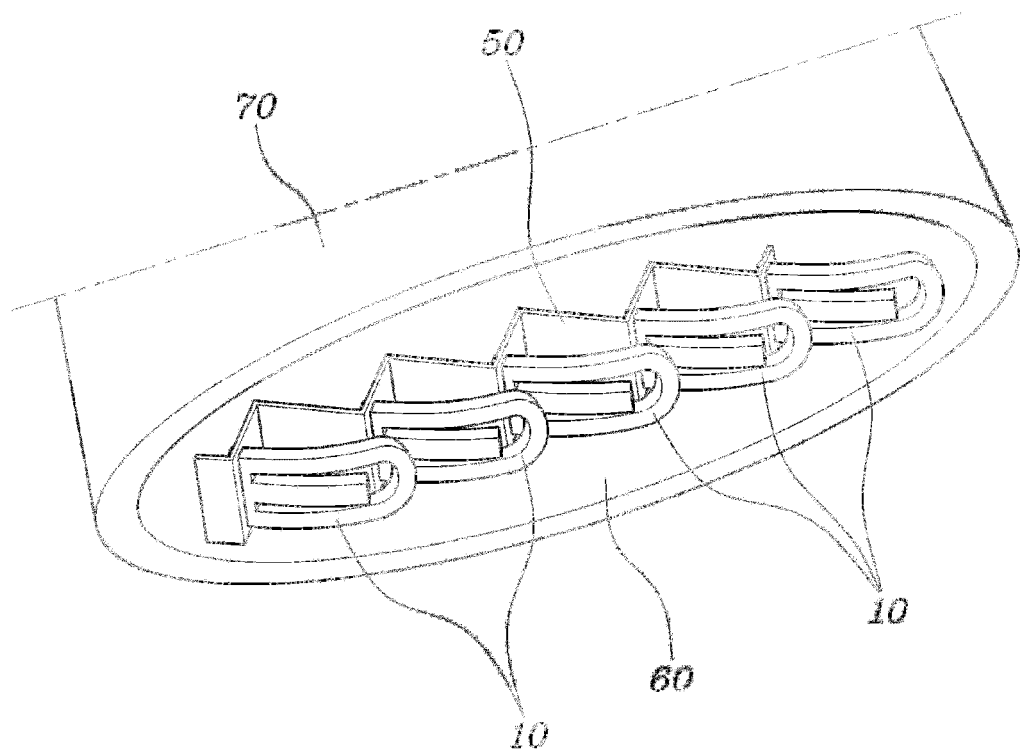
FIG. 1 is a perspective view illustrating the connection of a light source module of a lamp for a vehicle according to an embodiment of the present invention.
Figure 2:
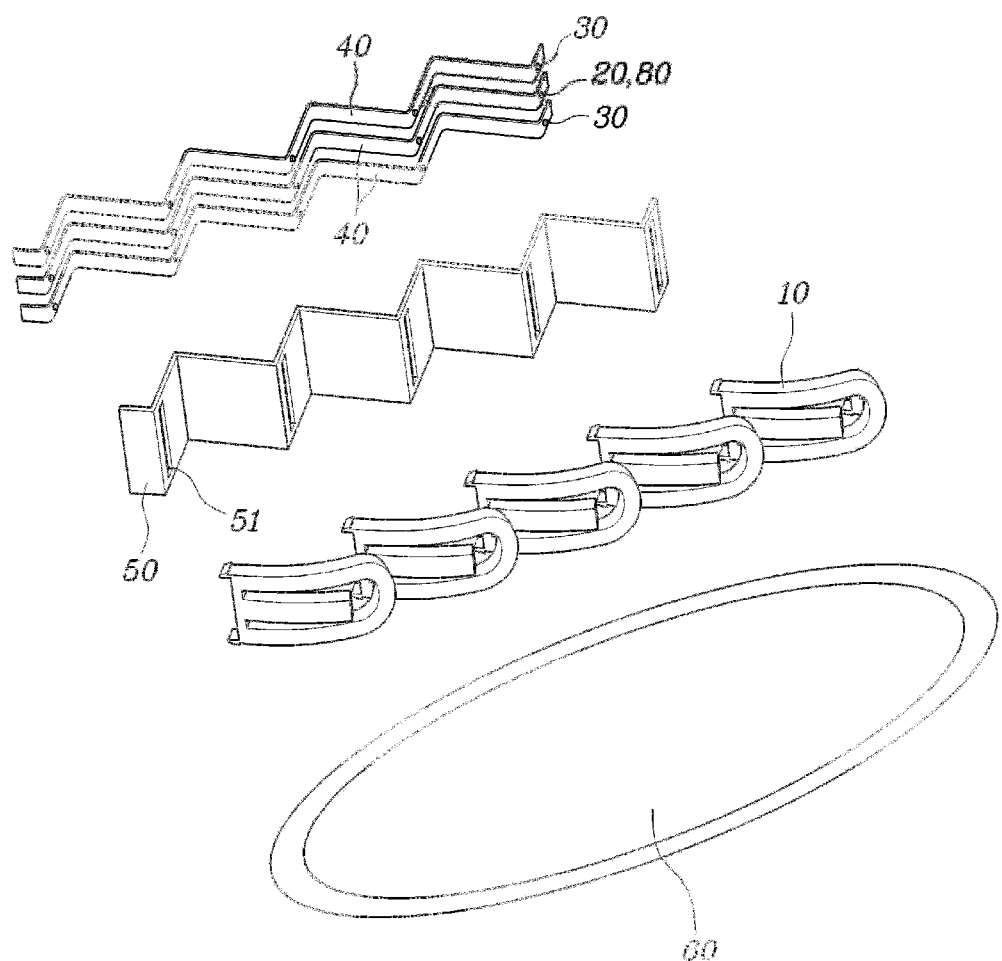
FIG. 2 is an exploded perspective view illustrating the light source module of a lamp for a vehicle according to the embodiment of the present invention.
Figure 3:
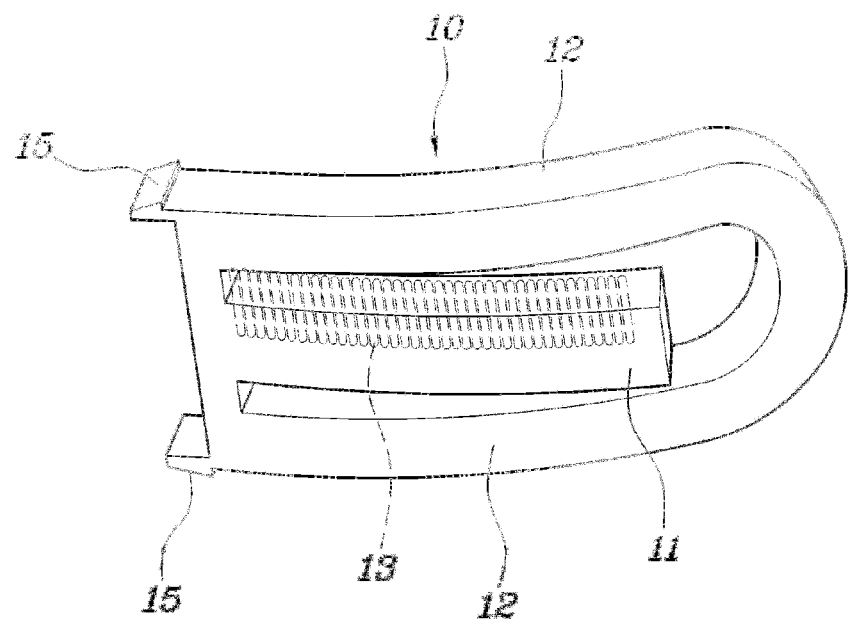
FIGS. 3 and 4 are a perspective view and a front view, respectively, illustrating an inner lens according to the embodiment of the present invention.
Figure 4:
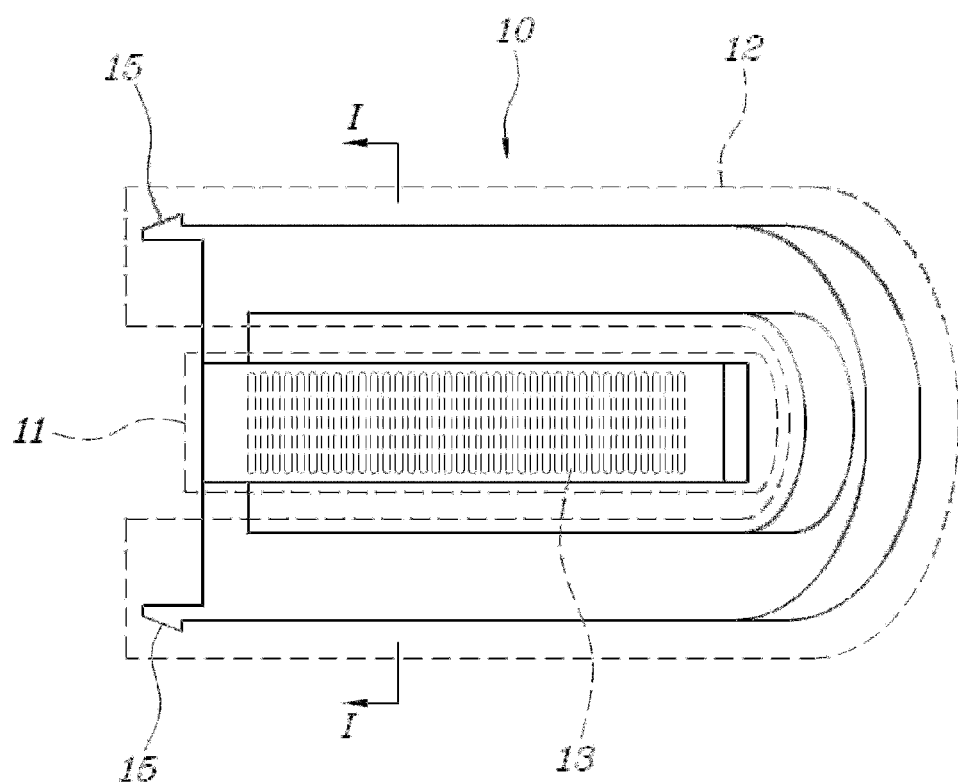
Figure 5:
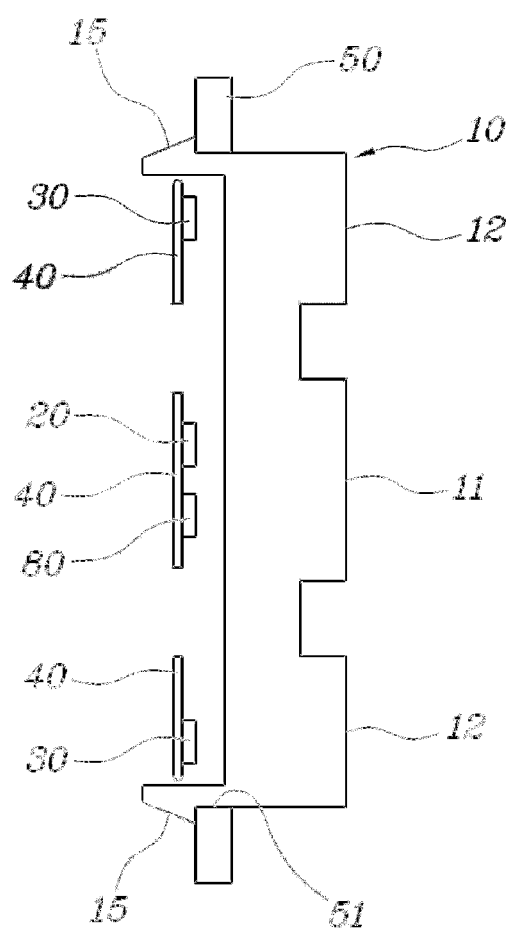
FIG. 5 is a partial sectional view illustrating the inner lens connected to a bezel according to the embodiment of the present invention.
Figure 6:
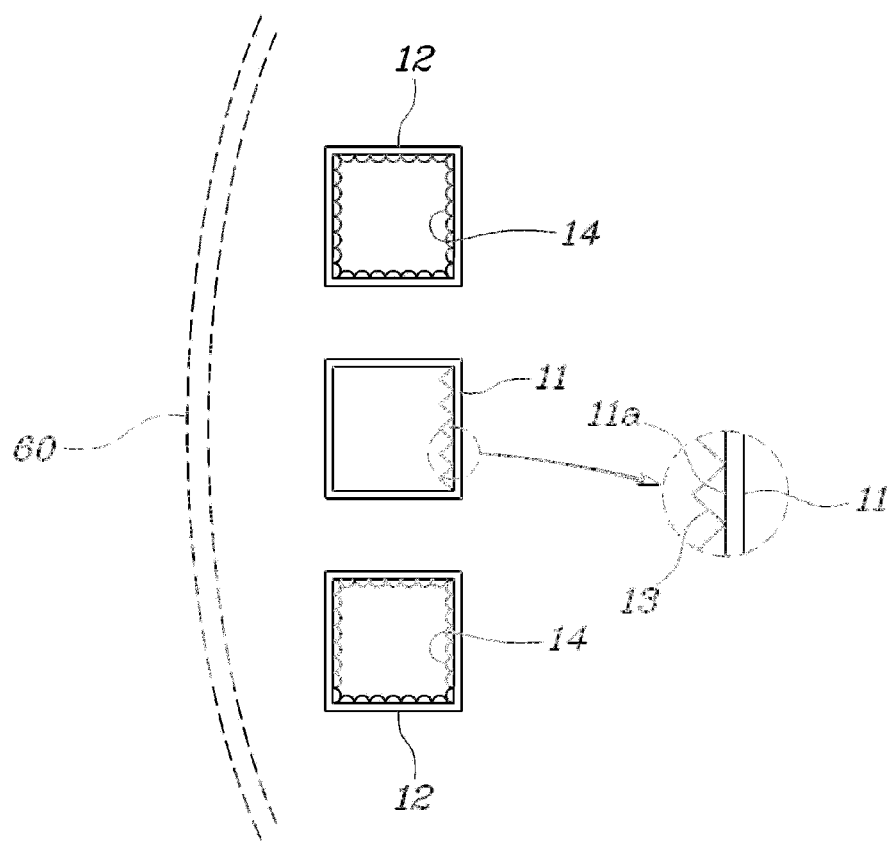
FIG. 6 is a sectional view taken along line I-I in FIG. 4.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, an exemplary embodiment of the present invention will be described in detail with reference to the accompanying drawings.

As shown in FIGS. 1 to 11, a light source module of a lamp (e.g., a rear lamp) for a vehicle according to the present invention includes: an inner lens that has a light guide part 11 radiating light in a predetermined direction; a light diffusion part 12 diffusing light in all directions, with an air gap disposed between the light guide part 11 and the light diffusion part 12; a first light source 20 radiating light to the light guide part 11; a second light source 30 radiating light to the light diffusion part 12; a printed circuit board (PCB) 40 coupled with the first light source 20 and the second light source 30, the PCB 40 controlling the supply of an electric current to the first light source 20 and the second light source 30; and a bezel 50 coupled with both the inner lens 10 and the PCB 40, the bezel 50 implementing a bezel image as a shape or a design when the first light source 20 and the second light source 30 are turned off. The light source module according to the present invention is configured such that the bezel 50 and the PCB 40 extend stepwise in one direction, and where the first light source 20, the second light source 30, and the inner lens 10 are provided on each of the steps of the bezel so as to implement a three dimensional pattern image when a light source is turned on.

In particular, the present invention realizes a three dimensional pattern image when the light sources are turned on by using the inner lens 10 combined stepwise and by turning the first and the second light sources 20 and 30 on or off. Thus, the present invention is advantageous in that the manufacturing cost thereof can be reduced as compared to an OLED used to implement a three dimensional pattern image. Further, the light source module is advantageous in that it can be brought in common use via mass production. Further, as mentioned hereinafter, it can provide a sufficient quantity of light by using an LED light source, and therefore it is suitable for a light source module of a lamp for a vehicle.

With the bezel 50 as the center, the inner lens 10 is combined with the front of the bezel 50 so that the inner lens 10 protrudes forward from the front of the bezel 50, and the PCB 40 coupled with the first light source 20 and the second light source 30 is combined with the back of the bezel 50.

The present invention further includes: an outer lens 60 placed in front of the inner lens 10 and covering the outer lens 60, and a lamp housing 70 with which the bezel 50 and the outer lens 60 are combined.

According to the present invention, the light generated from the first light source 20 radiates toward the outer lens 60. To achieve this, oriented optic protrusions 13 are provided on the outer lens 60-facing bottom 11a of the inside of the light guide part 11 so that the oriented optic protrusions 13 change the direction of the path of light so as to radiate the light generated from the first light source 20 toward the outer lens 60.

In addition, diffusion optic protrusions 14 are provided over the entirety of the inner surface of the light diffusion part 12 so that the diffusion optic protrusions 14 diffuse the light generated from the second light source 30 in all directions. The diffusion optic protrusions 14 may be protrusions having minute sizes.

A hook 15 may be provided on one side of the inner lens 10, and a locking hole 51 may be formed on the bezel 50 so that the hook 15 is locked to the locking hole 51 by being inserted therein.

The hook 15 is capable of being bent elastically from the inner lens 10 when an external force is exerted. Accordingly, the hook 15 shrinks elastically when inserted in the locking hole 51, but after being inserted the hook 15 restores its original shape and is combined with the back of the bezel 50.

Figure 7:
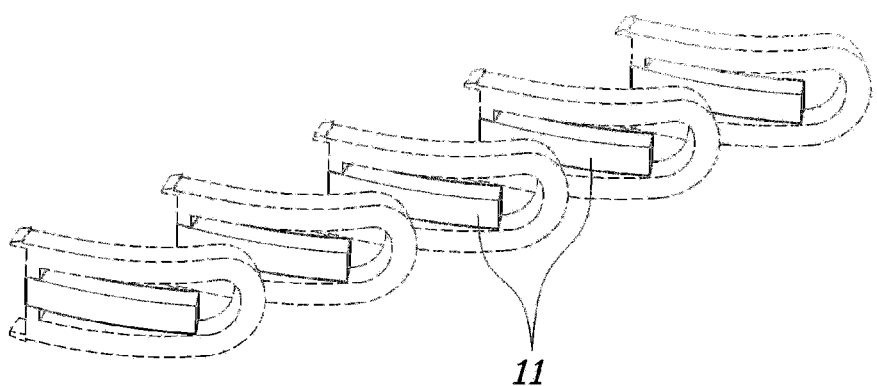

As shown in FIG. 7, the light guide part 11 serves as a stop lamp when the first light source 20 is turned on. To achieve this, the first light source 20 may be a red light emitting diode (LED) so as to perform a stop lamp function.

Figure 8:
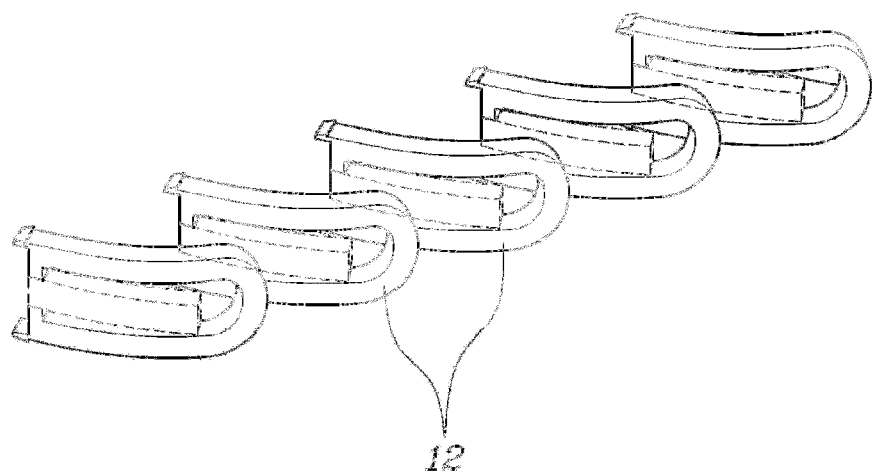

Further, as shown in FIG. 8, the light diffusion part 12 serves as a tail lamp when the second light source 30 is turned on. To achieve this, the second light source 30 may be a red LED so as to perform a tail lamp function.

The first light source 20 and the second light source 30 may be configured to be turned on or off individually by the control of the PCB 40. Accordingly, as shown in FIGS. 7 and 8, the light guide part 11 and the light diffusion part 12 may be turned on or off individually.

Further, the first light source 20 and the second light source 30 may be configured to be turned on or off simultaneously by the control of the PCB 40. Accordingly, as shown in FIG. 9, the light guide part 11 and the light diffusion part 12 may be turned on or off simultaneously.

Meanwhile, the present invention further includes a third light source 80 that is provided on one side of the first light source 20 on each of the steps formed by the PCB 40 and the bezel 50. The third light source 80 is coupled to the PCB 40 and radiates light to the light guide part 11 by the control of the PCB 40. The light guide part 11 serves as a turn signal lamp when the third light source 80 is turned on and off. To achieve this, the third light source 80 may be a yellow LED so as to perform a turn signal lamp function.

The third light source 80 continually repeats the turn-on and the turn-off by the control of the PCB 40 so that the light guide part 11 can perform a turn signal lamp function.

As described above, it is possible to realize a stop lamp function and a turn signal lamp function depending on the situation by using one light guide part 11. Accordingly, no additional parts to perform a turn signal lamp function are required. Therefore, it is advantageous in that the size of a lamp (e.g., a rear lamp) as well as the manufacturing cost and the weight thereof can be reduced.

Here, the third light source 80 may be configured to be turned on or off simultaneously or individually by the control of the PCB 40.

Figure 11:
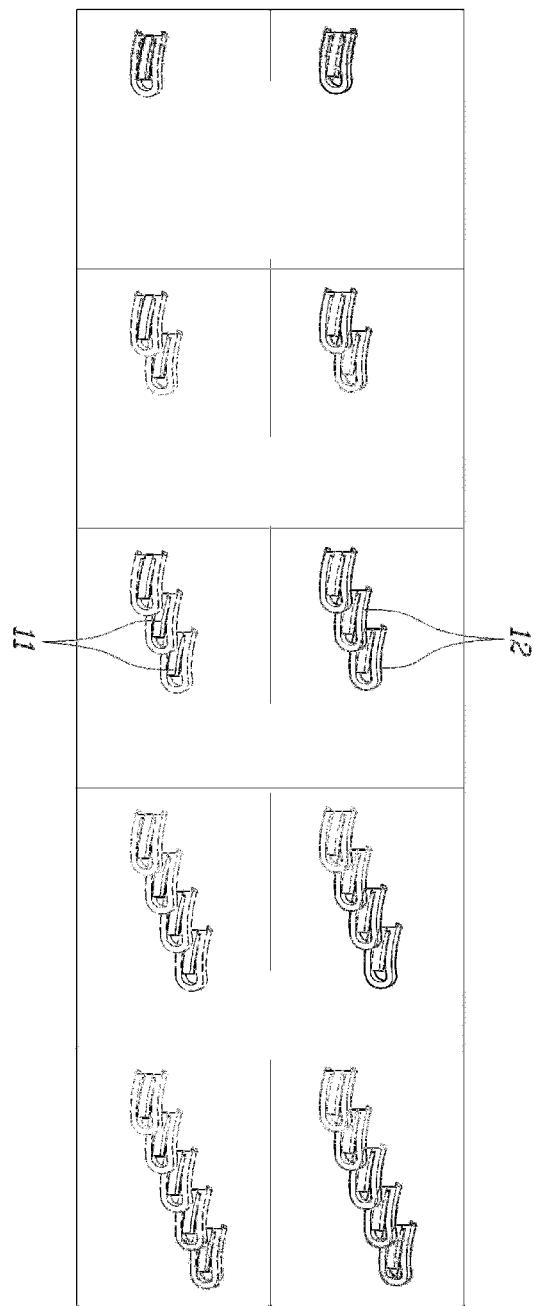
FIG. 11 is a view illustrating the sequential light-on state to implement a three dimensional pattern image of the light guide part and the light diffusion part when a light source is turned on according to the embodiment of the present invention.

In addition, the present invention enables the first, the second, and the third light sources 20, 30, and 80 provided on each of the steps, formed by the PCB 40 and the bezel 50, to be turned on or off simultaneously or sequentially along the steps by the control of the PCB 40. Thereby, as shown in FIG. 11, the light guide part 11 and the light diffusion part 12 are configured to be turned on or off sequentially along the steps.

As described hereinbefore, the present invention is capable of realizing a three dimensional pattern image when the light sources are turned on by using the inner lens 10 combined stepwise and by turning the first and the second light sources 20 and 30 on or off. Accordingly, it is capable of providing an improved luxurious effect for a vehicle, and thereby improving marketability. In particular, it is advantageous in that the manufacturing cost thereof can be much less than that of an OLED for implementing a three dimensional pattern image. Further, it is advantageous in that it can be brought in common use via mass production.

Further, the present invention can produce a sufficient quantity of light by use of an LED light source, and thus it is suitable for a light source module of a lamp for a vehicle.

Further, the present invention is configured such that a stop lamp function and a turn signal lamp function can be performed selectively depending on the situation using one light guide part 11. Accordingly, no additional parts to perform a turn signal lamp function are required. As a result, the size of a lamp (e.g., a rear lamp) as well as the manufacturing cost and the weight thereof can be reduced significantly.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A light source module of a lamp for a vehicle, comprising: a plurality of inner lenses, each including a light guide part and a light diffusion part, with an air gap disposed between the light guide part and the light diffusion part, the light guide part radiating light in a predetermined direction, and the light diffusion part diffusing light in all directions; a plurality of first light sources, each radiating light directly to the light guide part; a plurality of second light sources, each radiating light directly to the light diffusion part; a printed circuit board (PCB) coupled with the first and the second light sources, the PCB controlling supply of an electric current to the first and the second light sources; and a bezel coupled with both the inner lenses and the PCB, the bezel implementing a bezel image as a shape or a design when the first and the second light sources are turned off, wherein the bezel and the PCB extend stepwise in one direction, and each of the first and the second light sources and the inner lenses are provided on each of steps of the bezel so as to implement a three dimensional pattern image when at least one of the first and second light sources are turned on.

2. The light source module as set forth in claim 1, further comprising: an outer lens placed in front of the inner lenses and covering the inner lenses; and a lamp housing with which the bezel and the outer lens are combined.

3. The light source module as set forth in claim 2, wherein light generated from the first light sources radiates toward the outer lens through the respective light guide parts.

4. The light source module as set forth in claim 2, wherein oriented optic protrusions are provided on an outer, lens-facing bottom of an inside of each light guide part such that the oriented optic protrusions change a direction of a path of light so as to radiate light generated from the respective first light sources toward the outer lens.

5. The light source module as set forth in claim 1, wherein diffusion optic protrusions are provided over an entirety of an inner surface of each light diffusion part so that the diffusion optic protrusions diffuse light generated from the respective second light sources in all directions.

6. The light source module as set forth in claim 1, wherein the light guide parts serves as a stop lamp when the first light sources are turned on; and the first light sources are red light emitting diodes (LEDs) so as to perform a stop lamp function.

7. The light source module as set forth in claim 1, wherein the light diffusion parts serves as a tail lamp when the second light sources are turned on; and the second light sources are red light emitting diodes (LEDs) so as to perform a tail lamp function.

8. The light source module as set forth in claim 1, further comprising: a plurality of third light sources, each provided on one side of each of the first light sources on each of the steps, each third light source being coupled to the PCB and radiating light to each respective light guide part by control of the PCB, wherein the light guide parts serve as a turn signal lamp when the third light sources are turned on and off, and the third light sources are yellow light emitting diodes (LEDs) so as to perform a turn signal lamp function.

9. The light source module as set forth in claim 8, wherein the first, the second, and the third light sources are configured to be turned on or off simultaneously or individually by control of the PCB.

10. The light source module as set forth in claim 8, wherein the first, the second, and the third light sources provided on the steps are configured to be turned on or off simultaneously or sequentially by control of the PCB.

11. The light source module as set forth in claim 1, wherein a hook is provided on one side of each inner lens; and a plurality of locking holes are formed on the bezel so that each hook is locked to the respective locking hole by being inserted therein.

* * * * *